2,450,347

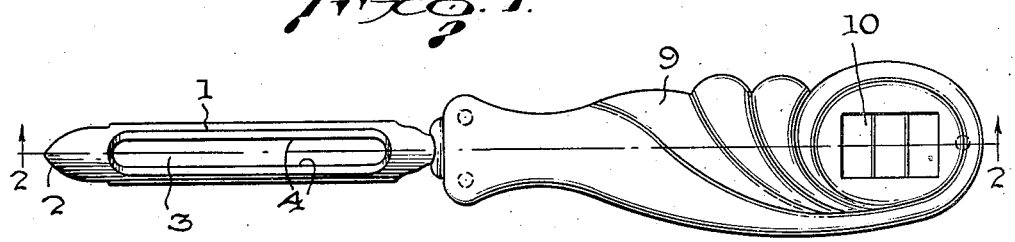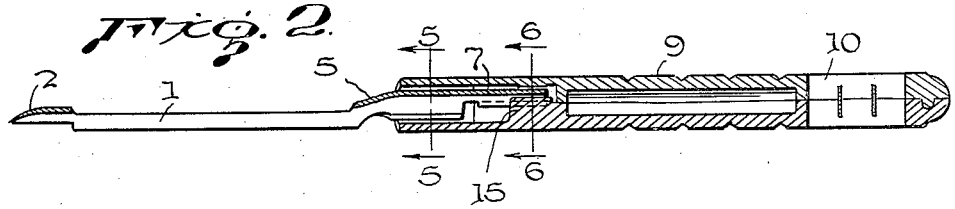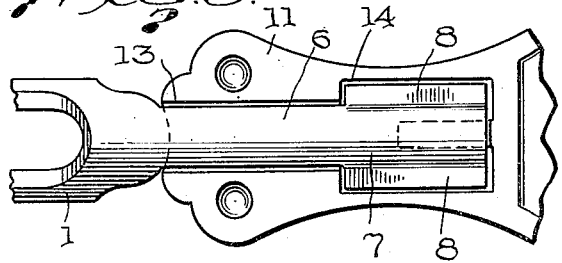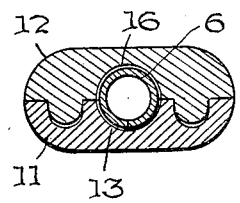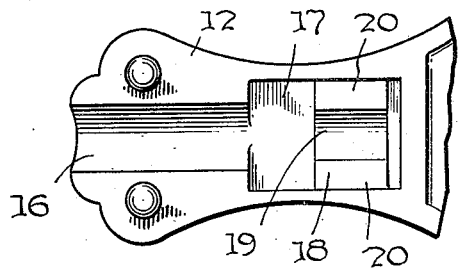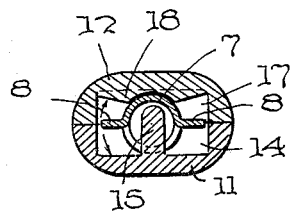
Sept. 28, 1948.  J. E. KRILOW  2,450,347
PARING UTENSIL
Filed June 2, 1945
INVENTOR.
JAMES E. KRILOW
BY
Lee F. Townshend
ATTORNEY Patented Sept. 28, 1948

UNITED STATES PATENT OFFICE 2,450,347

PARING UTENSIL

James E. Krilow, Atlantic City, N. J., assignor to Boardwalk Enterprises, Inc., Atlantic City, N. J., a corporation of New Jersey Application June 2, 1945, Serial No. 597,213

4 Claims. (Cl. 30—278)

1

This invention relates to a utensil for paring and coring fruits and vegetables having an oscillating guided paring and coring blade axially mounted with respect to a handle and more particularly to a simple practical and economical means for so mounting the blade in the handle to permit oscillation.

It is an object of this invention to provide a bi-sectional handle in which an extension on the blade is inserted when opened and upon assembly axially secures the blade in a position to resist end thrust and to permit an oscillation thereof.

Another object of the invention is to provide each section of the handle and the blade extension with cooperating means which upon assembly of the parts functions to permit oscillation of the blade and at the same time prevents withdrawal of the same from the handle.

Heretofore it has been a problem to satisfactorily mount an axial extending blade in a handle for oscillation and usually a one piece handle with an axial end bore is provided which requires separate bushings or lateral extensions through the handle to mount the blade extension therein. It is the object of this invention to simplify this mounting and the utilization of the bi-sectional handle assembly provides a simple and economical means for accomplishing this result.

These and other objects of the present invention will appear as the following description thereof proceeds, and in order to more clearly understand the invention, reference may be had to the accompanying drawing in which an embodiment of the invention is shown.

In the drawings:

Figure 1 is a plan view of the paring utensil;

Figure 2 is a longitudinal section on the line 2—2 of Figure 1;

Figure 3 is a fragmentary plan view of the inner face of one of the sections of the handle with the blade extension positioned therein;

Figure 4 is a similar view of the complementary portion of the other section of the handle;

Figure 5 is a cross section on the line 5—5 of Figure 2; and

Figure 6 is a cross section on the line 6—6 of Figure 2.

In the embodiment of the invention shown, the coring blade 1 is made of sheet metal and comprises an elongated body of concavo-convex cross-sectional shape which terminates at its free end in a suitably shaped and pointed corer extremity 2. The blade 1 is provided with a longitudinally extending centrally disposed slot 3, the side margins of which define oppositely directed

2 and suitably sharpened cutting edges 4. The blade is provided at its inner end with an integral handle received extension starting from the neck 5 and bent in tubular form as shown at 6 to form a journal. From adjacent the journal, the extension is bowed on its medial longitudinal line as shown at 7 and has laterally extending side wings 8 for a purpose to be hereinafter more fully described.

The utensil is provided with a handle 9 which may be suitably decorated and can carry a bean slitter 10 adjacent its outer end. In the embodiment shown, the handle is bi-sectional and each complementary section formed of molded plastic. The sections are designated by the numerals 11 and 12.

The blade extension receiving end of the section 11 is provided with a semi-cylindrical longitudinally extending groove 13 which forms one-half of the bearing for the journal 6 of the blade extension. From the bearing the groove is extended to form a substantially rectangular offset recess 14 which is slightly wider than the extension at the wings 8. Upstanding from the bottom of the recess 14 is a rocker support 15 over which is positioned the bowed portion 7 of the blade extension. Figure 3 shows these parts with the cooperative portions of the blade extension positioned thereon.

In Figure 4 is partly shown the complementary section 12 of the handle 1. The blade extension receiving end is provided with a semi-cylindrical longitudinally extending groove 16 to form the other half of the bearing for the journal 6. From the bearing, the groove is extended to form a substantially rectangular off-set recess 17 corresponding to the recess 14 in the section 11. The base of the recess 17 is provided with a mat 18 curved at its central portion 19 with outwardly inclined portions 20. The length of the mat 18 and the rocker support 15 is about the same and when the sections are assembled, they lie on opposite sides of the bow 7 of the blade extension.

To assemble the utensil, the sections 11 and 12 of the handle are laid open as shown in Figures 3 and 4 and the handle extension of the blade 1 is placed on the section 11 as clearly shown in Figure 3. The portion 7 will engage over the rocker support 15 and the journal 6 will lie in the bearing groove 13. The handle section 12 is then placed thereover being guided in position by conventional cooperating dowel pins and recesses on the meeting faces of the unrelieved portions of the sections. The sections being formed of plastic may be acetone sealed in the well known manner. When thus assembled, a socket is formed in the handle for the blade extension. The groove 16 completes an annular bearing for the journal 6 and the portion 19 of the mat 18 lies over the curved portion 7 of the blade extension positioned over the rocker support 15 and cooperates therewith. The journal and bearing described permits the blade and extension to rotate in the handle and the offset wings 8 of the portion 7 have a limited rocking motion in the offset chamber formed by the recesses 14 and 17 that limits the rotation to permit the oscillation of the blade 1 in the handle. The inclined portions 20 of the mat 18 permit full oscillation of the wings 8 on the axis of the blade within the limits of the wing enclosing chamber.

This invention provides a very simple assembly for the blade extension in the handle and results in a sturdy mount in which ends of the blade extension and wings take up end thrust against the enclosing chamber end wall and the top and bottom of said chamber limit the rotation or oscillation of the blade by wing contact therewith. The handle in the form shown is made of molded plastic but it is within the scope of my invention to form the sections of other materials.

This application is a continuation in part of my copending application Serial No. 535,786, filed May 16, 1944.

While the device herein disclosed has been described with more or less particularity, it is to be expressly understood that the invention is not limited to said device or otherwise than by the terms of the appended claims.

I claim:

1. A kitchen utensil including a bi-sectional handle having meeting faces each of which has a semi-cylindrical groove extending inwardly from one end to form a socket when the handle sections are assembled, a guided paring blade substantially coaxial with the handle and having an extension rotatably mounted in said socket, an offset recess for the socket formed by alined offsets on the grooves of each handle section, and means on the blade extension cooperating with the socket recess to limit rotation of the blade.

2. A paring utensil including a bi-sectional handle having meeting faces each of which has a semi-cylindrical groove extending inwardly from one end and terminating in an offset recess to form a socket when the handle sections are assembled, a guided paring blade substantially coaxial with the handle and having an extension provided with an annular journal rotatably mounted in the grooved portions of the assembled handle, and an offset on said blade extension cooperating with the offset recesses of the socket to limit rotation of the blade.

3. A paring utensil including a bi-sectional handle having meeting faces each of which has a semi-cylindrical groove extending inwardly from one end and terminating in an offset recess to form a socket when the handle sections are assembled, a guided paring blade substantially coaxial with the handle and having an extension provided with an annular journal rotatably mounted in the grooved portions of the assembled handle, and wings on said blade extension cooperating with the offset recesses of the socket to limit rotation of the blade.

4. A paring utensil including a bi-sectional handle having meeting faces each of which has a semi-cylindrical groove extending inwardly from one end and terminating in an offset recess to form a socket when the handle sections are assembled, a guided paring blade substantially coaxial with the handle and having an extension provided with an annular journal rotatably mounted in the grooved portions of the assembled handle, wings on said blade extension rockable upon rotation of the same and cooperating with the offset recesses of the socket to limit rotation of the blade, and a rocker support for the winged portion of the blade extension in said recesses.

JAMES E. KRILOW.

REFERENCES CITED

The following references are of record in the file of this patent:

UNITED STATES PATENTS

| Number | Name | Date |
|---|---|---|
| 1,551,096 | Gartin | Aug. 25, 1925 |
| 2,142,137 | Leary | Jan. 3, 1939 |
| 2,265,504 | Zimmer | Dec. 9, 1941 |
| 2,351,327 | Gamache | June 13, 1944 |